United States Patent
Fan et al.

(10) Patent No.: US 9,280,995 B2
(45) Date of Patent: Mar. 8, 2016

(54) LOCKING A DISK-LOCKED CLOCK USING TIMESTAMPS OF SUCCESSIVE SERVO ADDRESS MARKS IN A SPIRAL SERVO TRACK

(71) Applicant: LSI Corporation, San Jose, CA (US)

(72) Inventors: Xiangdong Fan, Shanghai (CN); Songtao Chen, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 35 days.

(21) Appl. No.: 14/244,846

(22) Filed: Apr. 3, 2014

(65) Prior Publication Data

US 2015/0279398 A1    Oct. 1, 2015

Related U.S. Application Data

(60) Provisional application No. 61/971,895, filed on Mar. 28, 2014.

(51) Int. Cl.
| | | |
|---|---|---|
| G11B 5/09 | (2006.01) | |
| G11B 5/596 | (2006.01) | |
| G11B 20/10 | (2006.01) | |
| G11B 20/12 | (2006.01) | |

(52) U.S. Cl.
CPC ........ *G11B 5/59644* (2013.01); *G11B 5/59616* (2013.01); *G11B 5/59627* (2013.01); *G11B 5/59661* (2013.01); *G11B 5/59666* (2013.01); *G11B 20/1024* (2013.01); *G11B 20/1025* (2013.01); *G11B 20/10222* (2013.01); *G11B 2020/1281* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 5,744,993 A | 4/1998 | Sonntag | |
| 7,248,549 B2 * | 7/2007 | Rauschmayer | 369/47.28 |
| 7,471,481 B2 * | 12/2008 | Lau et al. | 360/75 |
| 7,675,702 B2 * | 3/2010 | Watt et al. | 360/51 |
| 7,675,703 B2 * | 3/2010 | Albrecht et al. | 360/51 |
| 8,027,117 B1 * | 9/2011 | Sutardja et al. | 360/75 |
| 8,159,768 B1 | 4/2012 | Miyamura | |
| 8,477,445 B2 * | 7/2013 | Stein et al. | 360/51 |
| 8,508,878 B1 * | 8/2013 | Zou et al. | 360/51 |
| 8,514,511 B1 | 8/2013 | Tran et al. | |
| 8,531,792 B1 * | 9/2013 | Burd et al. | 360/51 |
| 8,780,476 B2 * | 7/2014 | Grundvig | 360/51 |
| 2009/0086357 A1 | 4/2009 | Ehrlich | |
| 2010/0103555 A1 | 4/2010 | Lau | |
| 2010/0118426 A1 * | 5/2010 | Vikramaditya et al. | 360/51 |

* cited by examiner

*Primary Examiner* — Dismery Mercedes (57) ABSTRACT

Described embodiments provide a magnetic mass storage device with a system clock phase-locked to servo address marks on the magnetic disk. A head sequentially reads multiple adjacent servo address marks in a spiral track of servo address marks. When a servo address mark detector detects a mark, the count value of a counter driven by the system clock is sampled and held by a latch. A system clock synthesizer calculates differences in value between successively sampled count values from the latch, averages the differences in value to create an average difference value, and normalizes a difference between the average difference value and a target value to create a phase error value. The phase of the system clock is updated using the phase error value.

20 Claims, 7 Drawing Sheets

| FREQ_OFFSET | SAMSTMP0 | SAMSTMP1 | SAMSTMP2 | SAMSTMP3 | SAMSTMP4 | SAMSTMP5 | DELTA1-0 | DELTA2-1 | DELTA3-2 | DELTA4-3 | DELTA5-4 | AVE_SMP_DIFF | FREQ_ERROR |
|---|---|---|---|---|---|---|---|---|---|---|---|---|---|
| 0 | 871426 | 886785 | 902146 | 917505 | 932864 | 948226 | 15359 | 15361 | 15359 | 15359 | 15362 | 15360 | 0 |
| 0.50% | 868613 | 883898 | 899184 | 914469 | 929750 | 945032 | 15285 | 15286 | 15285 | 15281 | 15282 | 15283.8 | 0.005 |
| -0.50% | 731804 | 747271 | 762736 | 778198 | 793668 | 809128 | 15467 | 15465 | 15462 | 15470 | 15460 | 15464.8 | -0.0068 |

FIG. 7

LOCKING A DISK-LOCKED CLOCK USING TIMESTAMPS OF SUCCESSIVE SERVO ADDRESS MARKS IN A SPIRAL SERVO TRACK

CROSS-REFERENCE TO RELATED APPLICATIONS

This application claims the benefit of the filing date of U.S. provisional patent application No. 61/971,895 filed 28 Mar. 2014, the teachings of which are incorporated herein by reference.

BACKGROUND OF THE INVENTION

1. Field of the Invention

The present invention relates to magnetic data storage systems generally and, more specifically, to disk clock locking using servo marks in magnetic storage systems.

2. Description of the Related Art

In magnetic disk data storage devices (also referred to as hard drives), the data is stored as magnetic flux regions or "magnets" along the surface of a rapidly spinning magnetic media or hard disk with one or more read/write heads "floating" or "flying" very near the media surface. Given the high data rates and low latency requirements of modern hard-drive read channels, data read from the hard disk is sampled and processed using a disk-locked clock (DLC). The DLC is phase-locked to the rotation speed of the hard disk so that the DLC tracks variations in the rotational (angular) speed of the disk when reading and writing to the disk.

There are two kinds of servo tracks on the hard disk. A radial servo track has a conventional (not spiral) servo pattern that contains track information and is used to lock the DLC during writing and reading of user data to and from the disk. A spiral servo track is used to lock the DLC as the radial servo track is written onto the hard disk. A well-known technique for writing the radial servo track is a Spiral Self-Servo Write (SSSW) process that writes the radial servo pattern onto the hard disk using the drive's own read head, write head, and servo system. The drive uses the radial position and timing information of a spiral servo track to write the radial servo track. The DLC system locks to the spiral servo track on the disk to perform the radial servo track write.

One technique for synchronizing the DLC to the radial servo track is to measure a time interval between spiral servo tracks written in a spiral patterns across the disk. The spiral servo tracks are written in such a way that, for a given disk rotation speed, the amount of time between when the spiral servo tracks pass under a read head is the same regardless of the head's radial position over the disk, i.e., how far away the head is from the center of the disk. Thus, for any radial position of the head, the time between spiral servo tracks is the same. In typical embodiments, a counter clocked by the DLC is sampled only once each time the read head encounters the spiral servo track and the value of the counter (a "time stamp") is compared to the immediately preceding time stamp and any difference in the time stamp values is used to generate a DLC-to-rotational speed phase error to correct or adjust the phase and frequency of the DLC so that it tracks the rotational speed of the disk, thereby phase-locking the DLC to the rotational speed of the disk.

The spiral servo tracks are typically a series of servo address marks (SAMs) separated by a short preamble. The preamble is a repeating pattern (e.g., 2T magnet length having a pattern . . . 11001100 . . . ) and the SAM pattern is a pre-established programmable wide biphase encoded pattern, in one example a nine-bit data pattern of $000101001_2$ that is biphase-encoded. However, because the servo tracks are placed at an angle with respect to the data tracks that the read head follows over the surface of the disk, the amplitude of the preambles and SAMs as read by the head varies considerably. In a typical hard drive, a series of sequential time-based windows are opened to detect a SAM in the signals from the read head, each window being just long enough for one SAM to occur therein. The SAM in the window having the highest amplitude signal therein is chosen as the SAM used to trigger sampling of the DLC-driven counter value. Knowing which window has the largest signal amplitude might be determinable only after it has passed the head. Moreover, because the window with the largest signal amplitude might not be exactly in the center of the servo track, there might be servo track-to-servo track differences in counter values that are not due to rotational speed variations in the disk. Thus, the differences in the sampled counter values can induce unwanted jitter in the phase of the DLC. It is therefore desirable to have a DLC-to-rotational speed phase error detection technique that is less susceptible to window signal amplitude variation and position of the SAM in the servo track.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a mass storage system comprising a rotating magnetic storage media, a head for reading the media, a servo address mark detector, a counter, a latch driven by a system clock, and a disk-locked clock synthesizer responsive to the latch and generates the system clock. The rotating magnetic storage media has adjacent servo address marks written in a spiral pattern of servo address marks on the storage media. The head is configured to read data and servo information stored on the media, and the head and the spiral pattern configured such that the head reads a plurality of adjacent servo address marks each time the head encounters the spiral pattern of servo address marks. The servo address mark detector is coupled to the head and is configured to detect servo address marks when read by the head. The latch is configured to sample a count value of the counter when triggered by the servo address mark detector. The synthesizer, as the head reads the plurality of adjacent servo address marks, is configured to calculate differences in value between successively sampled count values from the latch, average the differences in value to create an average difference value, normalize a difference between the average difference value and a target value to create a phase error value, and update a phase of the system clock in response to the phase error value.

BRIEF DESCRIPTION OF THE DRAWINGS

Other embodiments of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention will be described herein in the context of illustrative embodiments of an disk clock system adapted to be for use in a hard-disk drive or the like. It is to be appreciated, however, that the invention is not limited to the specific apparatus and methods illustratively shown and described herein. Rather, aspects of the invention are directed broadly to techniques for beneficially providing a disk-locked clock system with an improved technique for locking the disk-locked clock to the servo address marks.

For purposes of this description, a change in the magnetic flux on the surface of the magnetic media is a reversal in magnetic polarity from N to S or vice-versa. While magnetic resistive (MR) heads in hard drive systems detect the polarity of a magnetic flux, it is generally the case that a change in the magnetic flux polarity indicates a change in the data value, e.g., a "1" to a "0" or vice-versa, while no change in the polarity indicates no change in data value. When reading from the disk, the "magnet length" is defined by the sampling period of the samplers, i.e., because the data read from the magnetic media by the MR head is sampled using one or more samplers at a sample rate ($f_s$) approximately equal to or greater than the data rate of data read by the read head, one magnet length is equal to the total time or number of sample intervals that the sample (or flux) has the same value. For example, if the interval between flux reversals spans two samples, then the magnet length is two sample periods. In another example, a repeating 2T pattern (1, 1, 0, 0) is written to the media at a one (1) gigahertz (GHz) rate and then the written 2T pattern is read and sampled at a 2 GHz rate. In this example, the samples are 1, 1, 1, 1, 0, 0, 0, 0, so that the magnet length is four sample periods at the 2 GHz rate for a total time of 2 ns.

Figure 1:
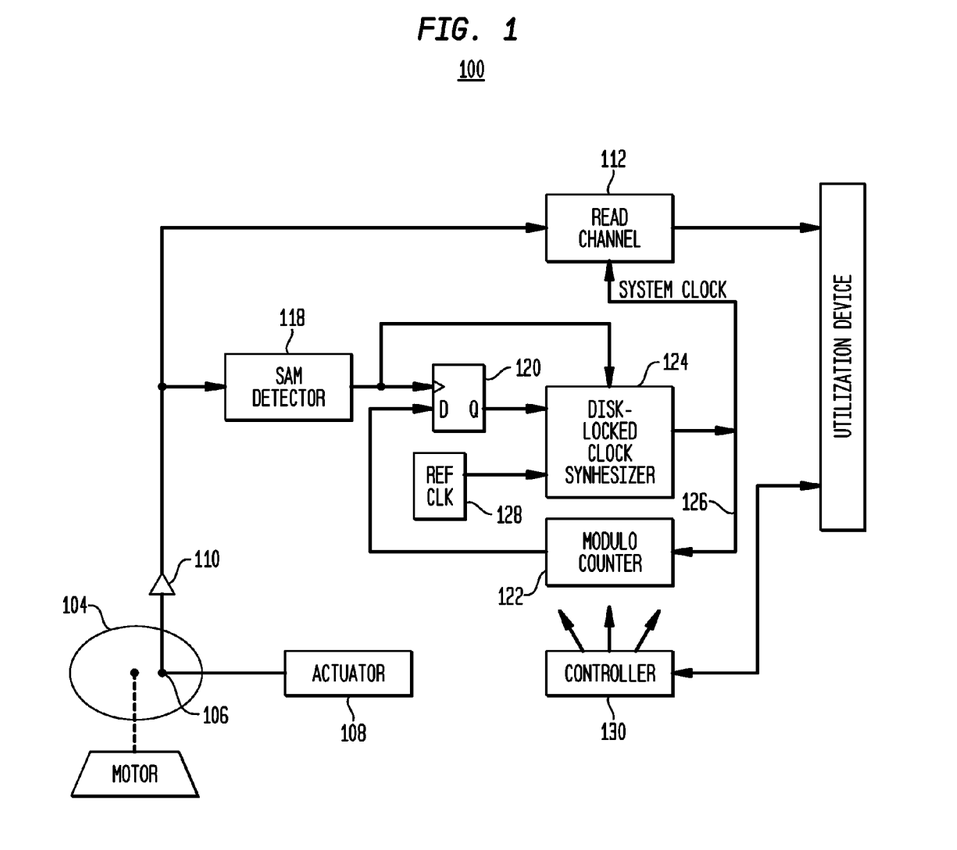
FIG. 1 is a simplified block diagram illustrating an exemplary magnetic disk storage device according to an embodiment of the invention.

FIG. 1 is a generalized block diagram of an exemplary mass storage (magnetic) hard-drive system 100. Operation of the hard drive system 100 is well known and is not discussed in detail here. Briefly, a system 100 typically has a motor (not numbered) driving a magnetic media 104, such as a magnetizable disk. User data and servo data stored on the disk 104 is read by a head 106, such as a magnetoresistive (MR) head, positioned by an actuator 108. Signals from the head 106 are first amplified by a preamplifier 110, typically located in proximity to the head 106, and then processed by read channel circuitry 112 with one or more analog-to-digital converters therein. The read channel circuitry might include a baseline correction circuit that adjusts the balance of differential signals from the preamplifier 110 to compensate for the drift in the average level of the incoming differential signal, and MR asymmetry and correction circuitry to compensate for distortions caused by the MR head 106. An exemplary embodiment of the read channel 102 can be found in U.S. Pat. No. 5,744,993 by J. L. Sonntag, incorporated by reference herein in its entirety. Digital signals from the read channel are coupled to a utilization device (not numbered) such as a computer for further processing.

Amplified signals from the preamplifier 110 are also processed by servo address mark detector 120. As discussed below, the detector 118 detects the presence of the servo address mark (SAM) in the signals from the preamplifier and, when a SAM is detected, the detector outputs a pulse that triggers register 120 to capture a sample or "snapshot" of counter 122 driven by a system clock generated by a disk-locked clock (DLC) synthesizer 124 and notifies the synthesizer 124 that a SAM was detected. The samples, also referred to as SAM "timestamps", are fed to the DLC synthesizer 124 that, in response to the samples received, controls the phase and frequency of a system clock signal 126 referenced to a reference clock 128. The synthesizer 124 might include a second order phase-locked loop or the like to generate the system clock and might have programmable computer implementing in software certain functions described below, as a state machine, or a combination thereof. As will be explained in more detail below and in accordance with an embodiment of the invention, the DLC synthesizer is configured to lock onto samples from each SAM detected, not just those SAMs with the highest or peak amplitude.

Figure 7:
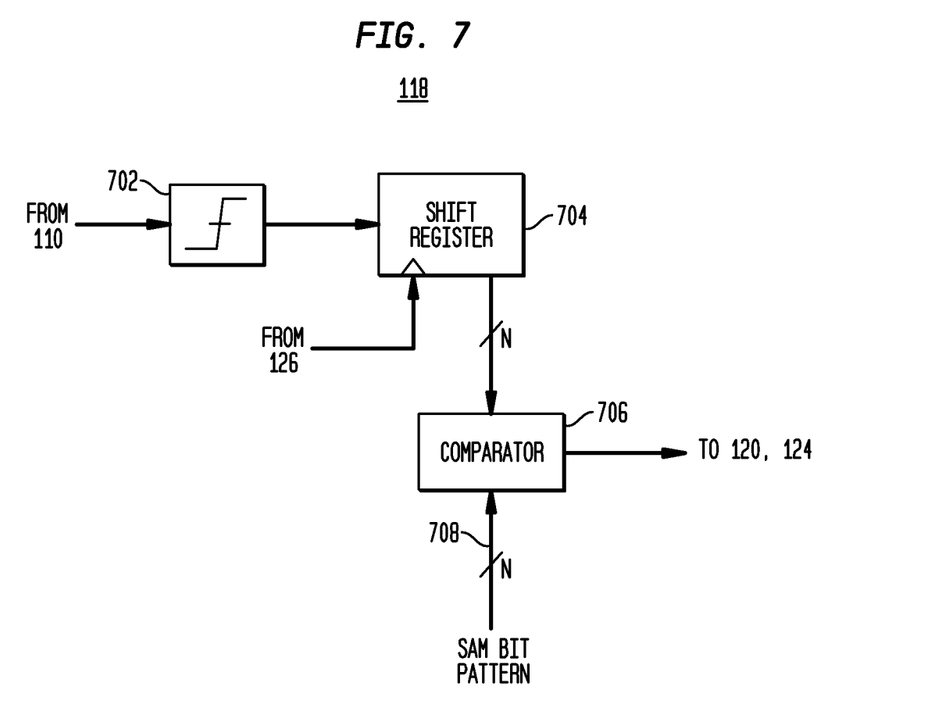
FIG. 7 is an exemplary embodiment of a servo address mark detector of FIG. 1.

As is understood in the art, the SAM detector 118, such as a digital signal processor or a configurable logic circuit and under control by the controller 130, is configured in one embodiment to detect SAMs and possibly the preambles between SAMs. As mentioned above, the typical SAM is a biphase-encoded pattern that will have a positive or negative peak at every 4T. When sampling the signal from the preamplifier 110 at intervals of 4T, a positive peak in the signal corresponds to logic one and a negative peak corresponds to logic zero. In one embodiment, by slicing the signal with a slicer (not shown) having a slicing threshold of zero, a positive or negative signal is easily detected to produce sliced data. It is understood that the slicer might employ hysteresis or offset thresholds instead of a single threshold to enhance the reliability of the detector when noise is present. In one embodiment, the sliced data is serially shifted into a shift register. When the shift register contains the SAM data pattern, a conventional matching circuit, such as a pattern detector using the pre-established sequence of preamble and SAM bit patterns, indicates that the SAM has been detected and the detector 118 generates an output signal accordingly. In another embodiment, the SAM detector 118 might employ a discrete Fourier transform (DFT) to detect the preamble. It is understood that the signal processor in the SAM detector might be shared with other signal processing functions, such as filtering data signals in the read channel 112. An exemplary SAM detector 118 is shown in FIG. 7 discussed below.

When the SAM detector 120 determines a SAM is present, the register 120 is triggered and latches the count of the counter 122 and the latched amount is sent to the DLC synthesizer 124. The counter 122 is a multi-bit, non-saturating counter that increments with each beat of the system clock 128 and is typically designed to overflow or "roll over" when the count exceeds a certain or modulo value. As will be evident below, the value is chosen so that if the motor speed and system clock are in the correct phase, the counter is designed overflow at the same rate as the rate the MR head 106 encounters a spiral track pattern of repeating SAMs previously written on the disk. It is understood that other techniques might be used instead of a clocked latch to capture the count of the counter 122 when a SAM is detected.

A controller 130 is typically a dedicated microprocessor or digital signal processor (DSP), coupled to the utilization device (computer, etc.), used to control the detailed operation of the mass storage system 100. One function of the controller 130 is to move the head 106 using the actuator 108 to the track on the media 104 requested by the utilization device and "fine-tuning" the head position by using servo channel data on the media 104 as feedback. Another function of the controller 130 is to adjust the various circuit functions of blocks 110-124 depending on the track being read/written on the media 104 and whether user data, servo data, or other data is being read by the MR head 106.

Figure 2:
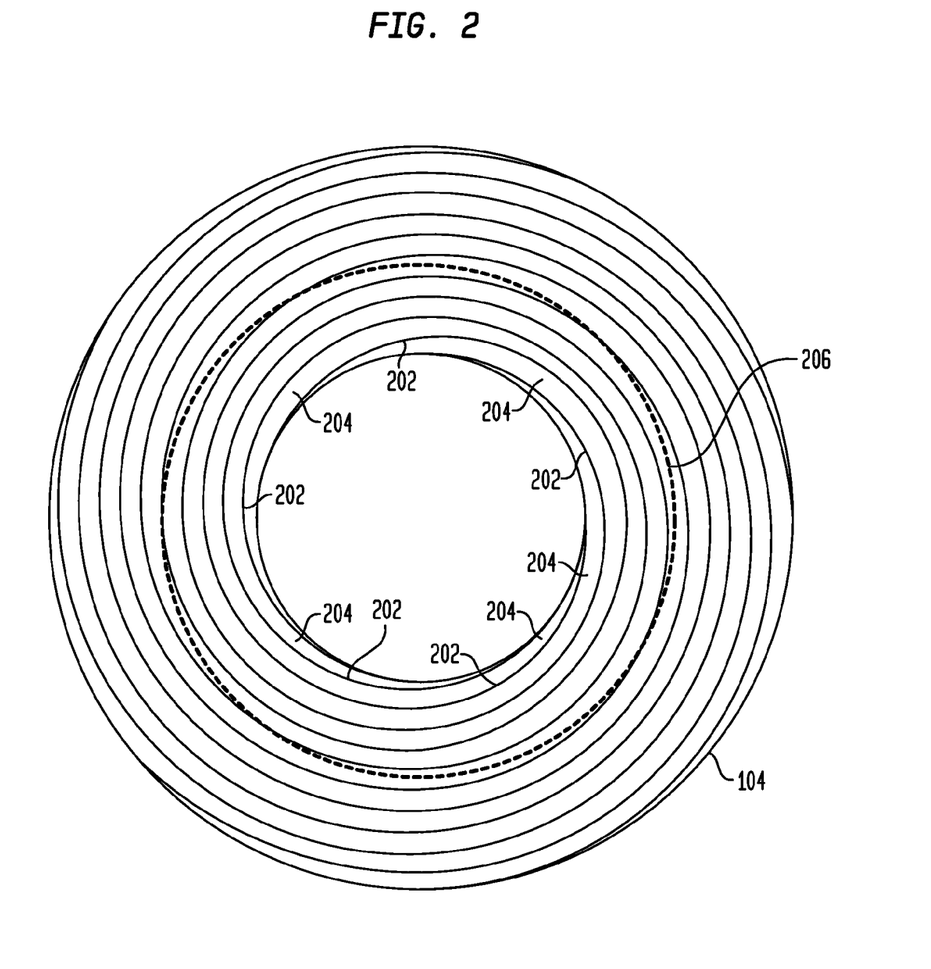
FIG. 2 is a diagram illustrating a magnetic disk with servo address marks thereon.

In FIG. 2, multiple spiral track patterns 202 of repeating SAMs are shown written onto the disk 104. In this example, there are five spiral tracks dividing the disk surface up into five essentially identical servo wedges 204, although fewer spiral tracks or more spiral tracks might be written onto the disk 104. An exemplary track 206 represents what the MR head 106 (FIG. 1) would read as the disk 104 passes beneath it, assuming that the head remains stationary, i.e., maintains a constant radius along the surface of the disk. During one revolution of the disk 104, the five spiral tracks will pass under the head 106. The spirals are written in such a way that for a constant rotational speed of the disk 104, the time interval $T_{spiral}$ the head 106 experiences between spirals is substantially the same regardless of what radius the track 206 is. In one embodiment, the modulo counter 122 (FIG. 1) is designed overflow or is reset at the same rate as the rate the MR head 106 encounters a spiral track pattern of the repeating SAMs previously written on the disk ($T_{spiral}$).

Figure 3:
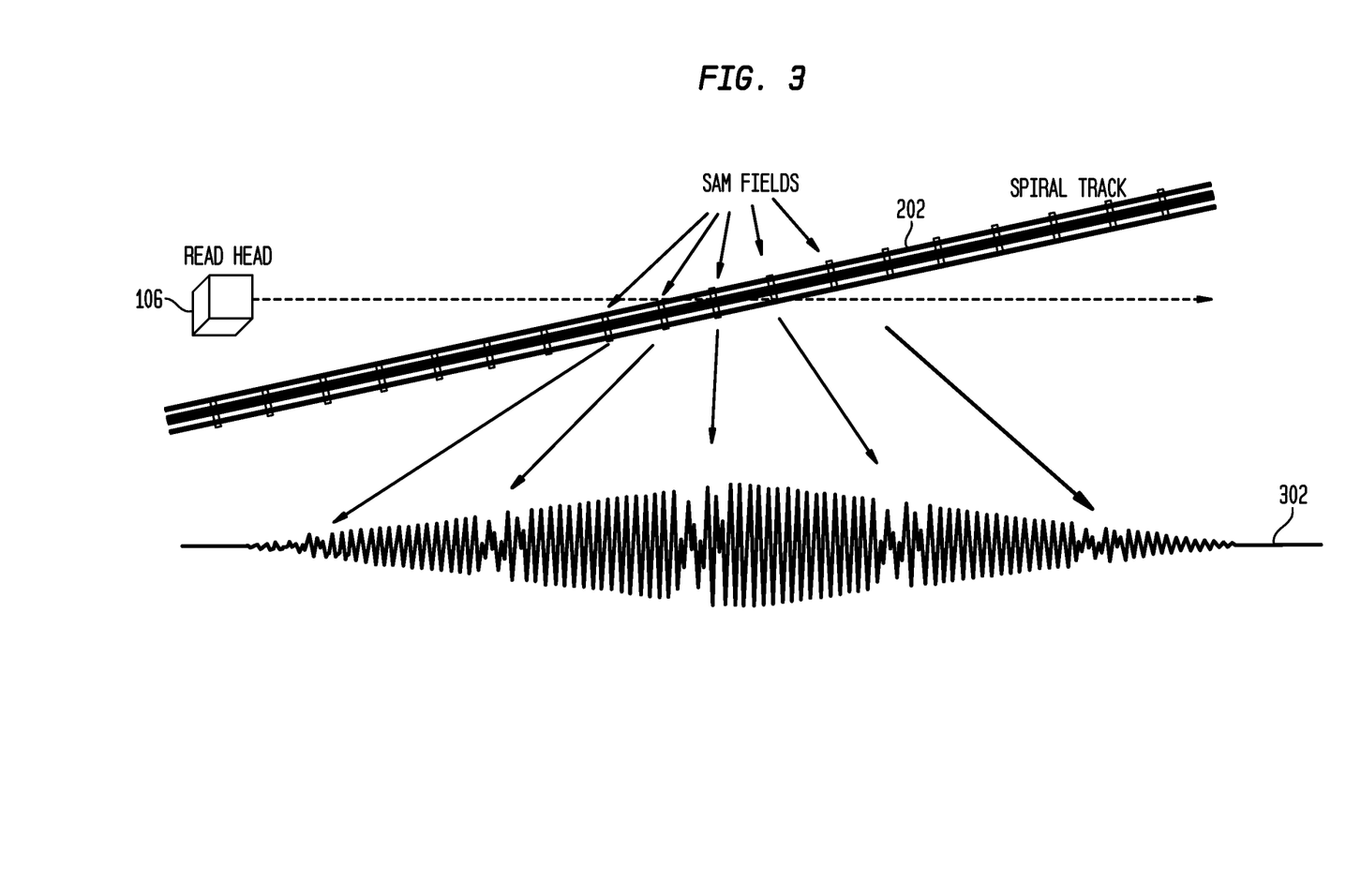
FIG. 3 is a diagram illustrating an exemplary servo address mark signal as read by a read head on the disk of FIG. 2.

FIG. 3 illustrates the passing of one exemplary spiral track 202 under the read head 106 and an exemplary waveform signal 302 from the head 106 as it passes over the spiral track 202. In this exemplary embodiment, there are five SAM fields that are sensed by the head 106. This yields the diamond-shaped signal 302 with the SAM fields of different amplitudes separated by a preamble pattern.

Figure 4:
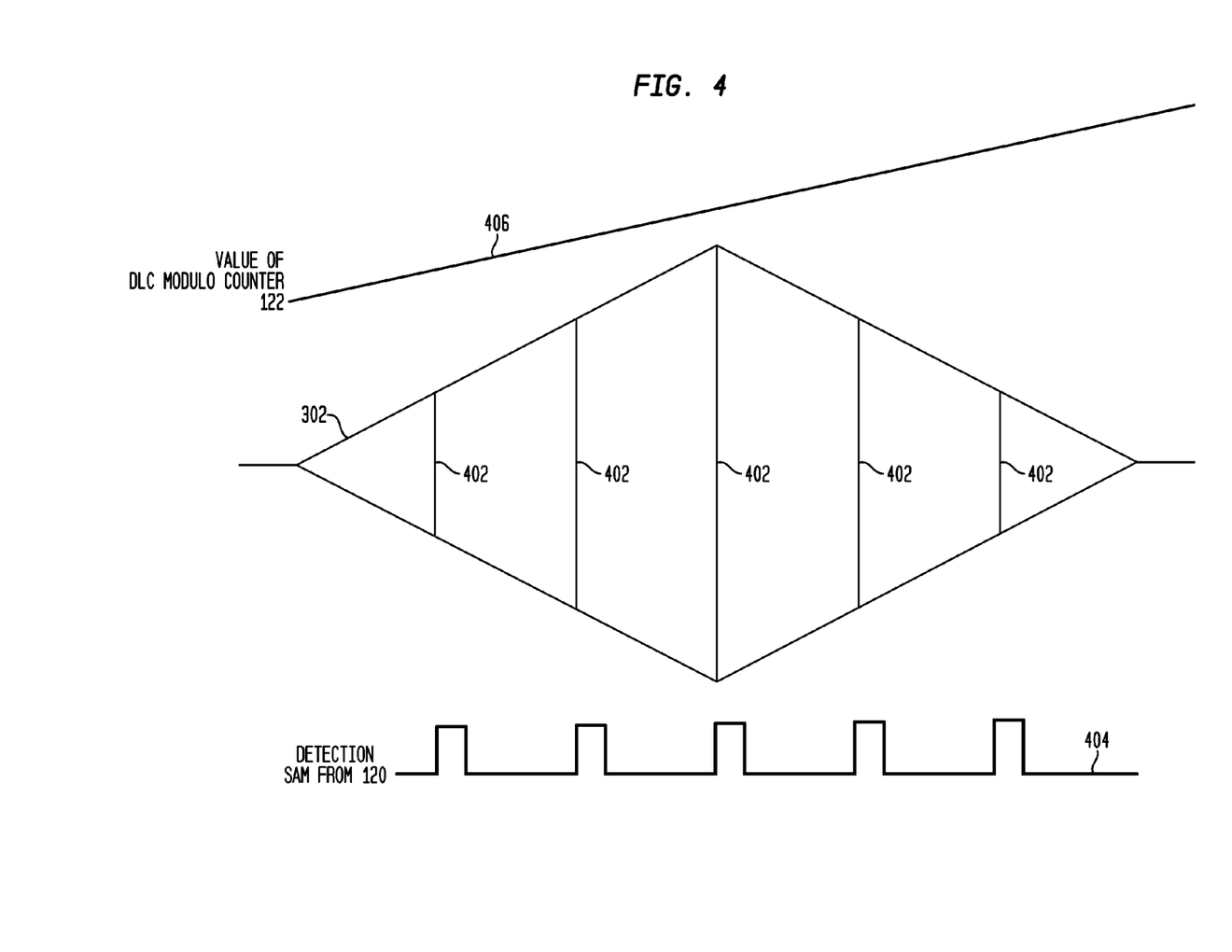
FIG. 4 illustrates in detail operation of a servo address mark derived disk-locked clock in accordance with an embodiment of the invention.

FIG. 4 illustrates the envelope of the signal 302 drawn as a diamond without the details of the signal 302 shown in FIG. 2 and the five SAMs therein as vertical lines 402. Waveform 404 represents the output of the SAM detector 118 (FIG. 1) when a SAM is detected in the signal 302. Waveform 406 represents the value of the modulo counter 122 increasing in value as the SAMs are detected. In prior art embodiments, only the SAM with the highest amplitude 404 is used to trigger the latch 120 (FIG. 1), such that the DLC synthesizer 124 is updated only once each time the MR head 106 encounters a spiral track 202 (FIGS. 2 and 3). If the SAM with the highest peak is not in the middle of the waveform 302, e.g., two substantially equal amplitude SAMs occur near the middle of the waveform 302, then using either SAM for updating the DLC synthesizer 124 might introduce jitter in the system clock 128 since the two SAMs will cause the latch 120 to capture different values from counter 122 than would be captured if the SAM was in the center of the waveform 302.

In accordance with one embodiment of the invention, each time a SAM is detected by the SAM detector 118 while the head 106 passes over a spiral track 202, the latch 120 is triggered and the DLC synthesizer 124 accumulates the samples. The synthesizer calculates differences between successive samples (i.e., subtracting the value of a sample S at time N ($S_N$) from the previous sample value at time N−1 ($S_{N-1}$)), and averaging the sample differences together to get an average value of the various sample or timestamp differences. For example, in FIG. 4, differences between the sampled counter 122 values for the five detected SAMs (resulting in four sample differences) are averaged together by the synthesizer 124 (FIG. 1) and the system clock 128 is adjusted accordingly. An exemplary process 500 for carrying this out is shown in FIG. 5

Figure 5:
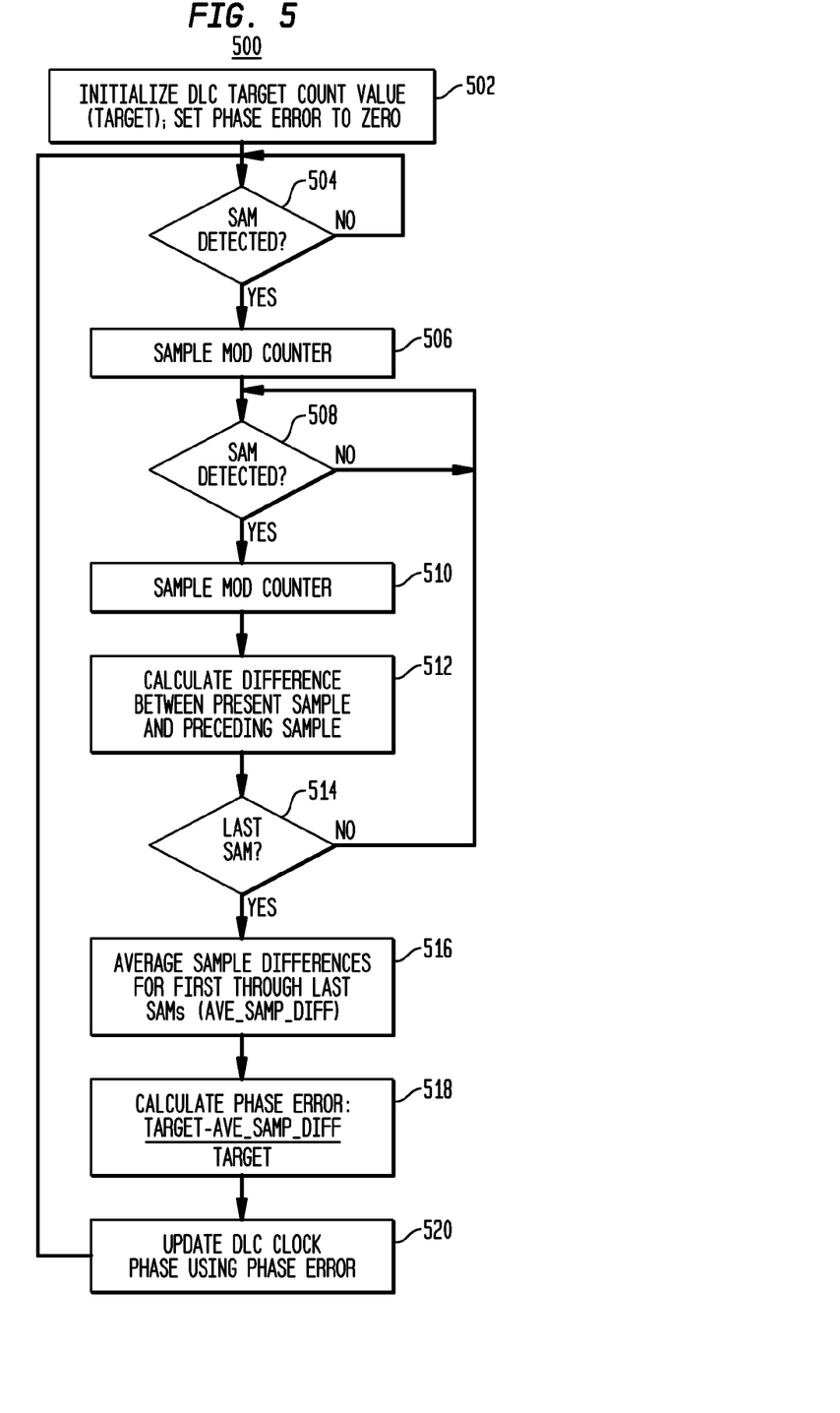
FIG. 5 is a simplified flowchart of timing acquisition using the servo address marks of FIG. 4 in accordance with an embodiment of the invention.

The process 500 in FIG. 5 begins with step 502 where the DLC synthesizer is initialized with a target count value TARGET, here the desired difference in sampled count values from the counter 122 for the synthesizer to use as an expected average difference count value when in the synthesizer is in "lock". In addition, the phase error used to adjust the phase of the system clock 128 with respect to the reference clock 128 is set to zero. These values are exemplary and other values might be used as needed. Next, in step 504, the synthesizer waits for the SAM detector to detect the first SAM. Once that first SAM is detected, the counter 122 is sampled by the latch 120 in step 506, accepts the sample in the latch, and the synthesizer waits for the next SAM to be detected in step 508. Once another SAM is detected, the counter 122 is again sampled by latch 120 in step 510 and the synthesizer accepts the sample from latch 120 and calculates the difference between the samples in step 512. If the last SAM has not been detected, control passes back to step 508. If the last SAM for the particular spiral track has been detected (e.g., all five SAMs shown in FIG. 4 have been detected), then the synthesizer averages the sample differences for the first through last detected SAMs to generate the variable AVE_SAMP_DIFF in step 516. Knowing if the last SAM has been detected in step 514 might be accomplished by knowing in advance the number of SAMs to be detected for each spiral track, using a timed window where SAMs are detected only during the timed window, or a time-out occurs where no SAM is detected after a time-out period has elapsed indicates that the previous SAM detected is the last one to be detected. Other techniques might be used as well.

Once the average sample difference is calculated in step 516, the synthesizer calculates the phase error, i.e., the amount of error between the actual phase of the system clock and the correct phase for proper operation of the hard drive system 100, by taking the difference between the target phase difference (TARGET) and the calculated average phase difference (AVE_SAMP_DIFF) from step 516, and the difference normalized to the target phase difference. Then the calculated phase error is used by the PLL (not shown) in the synthesizer to update the DLC clock phase in step 520 and the process begins again at step 504.

EXAMPLE

Figure 6:
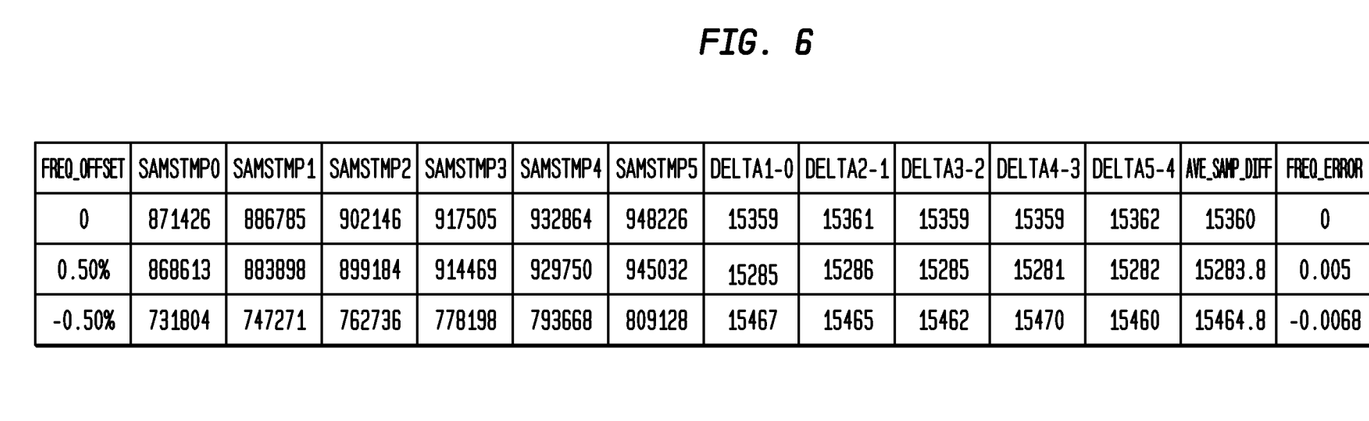
FIG. 6 are exemplary values the operation of the timing acquisition during the process shown in FIG. 5.

Using a 20-bit modulo $2^{20}$ counter 122, a nominal system clock of 1 GHz, and a target value (TARGET) of 15360, the results shown in FIG. 6 illustrate operation of the process in FIG. 5 for frequency offsets of 0, 0.50% above target, and 0.50% below target frequency. Six SAMs are detected for each frequency offset. The variables SAMSTMP0-SAMSTMP5 are values of the modulo counter 122 at the time the respective SAM was detected. Variables DELTA1-0-DELTA5-4 are the differences between respective adjacent samples (e.g., DELTA1-0 is the difference between SAMSTMP1 and SAMSTMP0). AVE_SAMP_DIFF is the average of the differences as calculated in step 516 (FIG. 5) and described above. FREQ_ERROR is the error value calculated in step 518 and as described above. The value of FREQ_ERROR is used by the PLL in the synthesizer 124 to change the frequency of the system clock by the calculated percentage.

FIG. 7 illustrates an exemplary SAM detector 118 using a shift register and matching circuitry. Here, a slicer 702 digitizes signals from the preamplifier 110 and a serial-to-parallel shift register 704 clocked by the system clock 126 receives the digitized signals. A comparator 706 compares the N-bit parallel data in the shift register to an N-bit pre-established bit pattern of a SAM (e.g., $000101001_2$, where N=9) applied to input 708 and, when a match occurs, the comparator 706 asserts the output of the detector 118. The SAM bit pattern on input 708 might be programmable. An alternative embodiment includes a state machine configured to detect the pre-established pattern of the SAM.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

It is understood that various changes in the details, materials, and arrangements of the parts which have been described and illustrated in order to explain the nature of this invention might be made by those skilled in the art without departing from the scope of the invention as expressed in the following claims.

The invention claimed is:

1. A mass storage system comprising:
a rotating magnetic storage media having adjacent servo address marks written in a spiral pattern of servo address marks on the storage media;
a head configured to read data and servo information stored on the media, the head and the spiral pattern configured such that the head reads a plurality of adjacent servo address marks each time the head encounters the spiral pattern of servo address marks;
a servo address mark detector coupled to the head and configured to detect servo address marks when read by the head;
a counter driven by a system clock;
a latch responsive to an output of the servo address mark detector and configured to sample a count value of the counter when triggered by the servo address mark detector; and
a disk-locked clock synthesizer, responsive to the latch, configured to generate the system clock;
wherein the synthesizer, as the head reads the plurality of adjacent servo address marks, is configured to:
calculate differences in value between successively sampled count values from the latch;
average the differences in value to create an average difference value;
normalize a difference between the average difference value and a target value to create a phase error value; and
update a phase of the system clock in response to the phase error value.

2. The mass storage system of claim 1 wherein a plurality of the spiral patterns of servo address marks are written on the storage media, the spiral patterns spaced such that, for a constant rotational speed of the storage media, a time interval (Tspiral) the head experiences between spirals is substantially the same regardless of what radius the head is over the storage media, and wherein the counter is designed overflow at the same rate as the time interval Tspiral.

3. The mass storage system of claim 1 wherein the head and the spiral pattern are configured such that the head reads a known number greater than one of adjacent servo address marks each time the head encounters the spiral pattern of servo address marks.

4. The mass storage system of claim 1 wherein the head reads the plurality of adjacent servo address marks using one of a timed window where servo address marks are detected only during the timed window, or before a time-out occurs during which no servo address mark is detected by the detector.

5. The mass storage system of claim 1 wherein the phase error is calculated in accordance with:

(TARGET−AVE_SAMP DIFF)/TARGET;

where TARGET is a desired average difference value when the system clock is locked to the servo address marks, and AVE_ SAMP DIFF is an actual average difference count value.

6. The mass storage system of claim 1 wherein the synthesizer comprises a phase-locked loop generating the system clock, the phase locked loop responsive to the phase error signal and a reference clock.

7. The mass storage system of claim 1 wherein the synthesizer further comprises a processor configured to control the phase locked loop, responsive to the detector and the latch, and perform the steps recited in claim 1.

8. The mass storage system of claim 1 wherein the processor is one of a programmable computer, a state machine, and a combination thereof.

9. The mass storage system of claim 1 wherein the synthesizer, prior to phase locking the system clock to the servo address marks, the phase error is set to zero.

10. The mass storage system of claim 1 wherein the spiral pattern of servo address marks comprises an alternating sequence of preamble and servo address mark bit patterns, and the servo address mark detector is a pattern detector configured to detect the preamble and servo address marks bit patterns.

11. The mass storage system of claim 1 wherein the servo address mark detector comprises:
a slicer, coupled to the head, configured to slice signals from the head to generate sliced data;
a shift register configured to receive and serially shift the sliced data therein; and
a comparator, coupled to the shift register, configured to compare the sliced data in the shift register with a pre-established bit pattern;
wherein the comparator triggers the output of the servo address mark detector when the sliced data in the shift register matches the pre-established bit pattern.

12. A method for phase locking a system clock to servo address marks in a mass storage system having a rotating magnetic storage media and head over the media for reading data and servo information thereon, the rotating magnetic storage media having adjacent servo address marks written in a spiral pattern of servo address marks on the storage media, and a counter driven by a system clock, the method comprising the steps of:
reading, by the head, a plurality of adjacent servo address marks each time the head encounters the spiral pattern of servo address marks;
detecting each of adjacent servo address marks read by the head;
sampling the counter, via a latch, to obtain a sampled count value each time a servo address mark is detected;
calculating differences in value between successive sampled count values from the latch;
averaging the differences in value to create an average difference value;
normalizing a difference between the average difference value and a target value to create a phase error value; and updating a phase of the system clock in response to the phase error value.

13. The method of claim 12 wherein a plurality of the spiral patterns of servo address marks are written on the storage media, the spiral patterns spaced such that, for a constant rotational speed of the storage media, a time interval (Tspiral) the head experiences between spirals is substantially the same regardless of what radius the head is over the storage media, and wherein the counter is designed overflow at the same rate as the time interval Tspiral.

14. The method of claim 12 wherein the head and the spiral pattern are configured such that the head reads a known number greater than one of adjacent servo address marks each time the head encounters the spiral pattern of servo address marks.

15. The method of claim 12 wherein the head reads the plurality of adjacent servo address marks using one of a timed window where servo address marks are detected only during the timed window, or before a time-out occurs during which no servo address mark is detected by the detector.

16. The method of claim 12 wherein in the step of normalizing, the phase error is calculated in accordance with:

$$(TARGET-AVE\_SAMP\ DIFF)/TARGET;$$

where TARGET is a desired average difference value when the system clock is locked to the servo address marks, and AVE_ SAMP DIFF is an actual average difference count value.

17. The method of claim 12 wherein the synthesizer, prior to phase locking the system clock to the servo address marks, the phase error is set to zero.

18. The method of claim 12 wherein the spiral pattern of servo address marks comprises an alternating sequence of preamble and servo address mark bit patterns, and the step of detecting each of adjacent servo address marks read by the head comprises the step of detecting the preamble and servo address marks bit patterns.

19. The method of claim 12 wherein the step of detecting each of adjacent servo address marks read by the head comprises the steps of:
slicing signals from the head to generate sliced data;
serially shifting the sliced data into a shift register; and
comparing the sliced data in the shift register with a pre-established bit pattern;
wherein the servo address mark is detected when the sliced data in the shift register matches the pre-established bit pattern.

20. A method for phase locking a system clock to servo address marks in a mass storage system having a rotating magnetic storage media and head over the media for reading data and servo information thereon, the rotating magnetic storage media having adjacent servo address marks written in a spiral pattern of servo address marks on the storage media, and a counter driven by a system clock, the method comprising the steps of:
reading, by the head, a plurality of adjacent servo address marks each time the head encounters the spiral pattern of servo address marks;
slicing signals from the head to generate sliced data;
serially shifting the sliced data into a shift register;
detecting a servo address mark when the sliced data in the shift register matches a pre-established bit pattern;
sampling the counter, via a latch, to obtain a sampled count value each time a servo address mark is detected;
calculating differences in value between successive sampled count values from the latch;
averaging the differences in value to create an average difference value;
normalizing a difference between the average difference value and a target value to create a phase error value; and
updating a phase of the system clock in response to the phase error value; wherein the phase error is calculated in accordance with: (TARGET−AVE_SAMP DIFF)/TARGET; where TARGET is a desired average difference value when the system clock is locked to the servo address marks, and AVE_SAMP DIFF is an actual average difference count value.

* * * * *